Patented June 13, 1933

1,913,631

UNITED STATES PATENT OFFICE

GEORGE DE WITT GRAVES, OF WILMINGTON, DELAWARE

MEANS AND METHOD OF NEUTRALIZING INSECT AND PLANT POISONS

No Drawing.   Application filed September 13, 1929. Serial No. 392,483.

This invention relates to pharmaceutical preparations and more particularly to preparations for use in neutralizing the poisons resulting from insect stings and from contact with various poisonous plants. It also relates to a method of effecting such neutralization which involves the use of various organic bases, either alone or in the form of liniments or ointments.

It is well known that the disagreeable and often painful effects of the stings of certain insects, such as mosquitos, bees, flies, and ants, as well as the poisonous effects of contact with such plants as poison ivy, nettles, etc., are caused by the presence in the affected part of certain acidic irritants. The substances which have heretofore been employed for neutralizing these irritating poisons were inorganic alkaline materials, such as sodium carbonate and bicarbonate, ammonia, and various kinds of soaps. These remedies have not generally proved satisfactory, either because of their tendency to produce irritation of the affected part, or because of inconvenient physical properties which make their use difficult or unpleasant.

This invention has as an object to provide a convenient and effective method for neutralizing insect and plant poisons.

Another object is to provide a method of treatment in which an antiseptic and antidotal compound which is readily soluble in water and alcohol is employed.

A still further object is to provide a method involving the use of an ointment in which both the active principle and the vehicle or medium in which it is carried are soluble both in water and alcohol.

Other objects will appear hereinafter.

I have discovered that the organic bases may be very effectively used to neutralize the acid irritants above referred to. The above objects are therefore accomplished by the following invention which comprises the compounding of a water- or alcohol-soluble organic base, or bases, with either a liquid or solid medium to form an emollient preparation and its application to the affected part, or by the direct application of these bases without the addition of other materials.

The following examples of my antiseptic and antidotal composition are inserted merely for purposes of illustration and are not to be regarded in any sense as a limitation;

In the case of liniments I may make up an aqueous or alcoholic solution of any one or a number of the organic bases, such as cyclohexylamine, cyclohexylamine carbonate, monoethanolamine, diethanolamine, triethanolamine, cyclohexylethanolamine, etc., as follows:

Example 1.—A 25% aqueous solution of triethanolamine.

Example 2.—A 10% aqueous solution of triethanolamine.

Example 3.—A 75% aqueous solution of commercial triethanolamine.

Example 4.—A 25% solution of commercial triethanolamine in ethyl alcohol.

Example 5.—A 10% aqueous solution of cyclohexylamine carbonate.

Example 6.—A 25% solution of cyclohexylamine in ethyl alcohol.

Example 7.—A 10% aqueous solution of cyclohexylamine.

Example 8.—A 10% alcoholic solution of cyclohexylethanolamine.

Ointments with very desirable properties can be prepared by combining organic amines with high molecular weight organic acids to form salts analogous to those formed by the interaction of the inorganic bases with organic acids. Examples are as follows:

Example 9.—2 parts by weight of stearic acid are mixed with 1 part by weight of triethanolamine and 4 parts by weight of water. This forms an ointment of satisfactory consistency which is soluble in water and therefore can easily be removed from skin or clothing. Other ointment compositions are as follows:

Example 10.—2 parts by weight of oleic acid mixed with 1 part by weight of triethanolamine.

Example 11.—2 parts by weight of oleic acid with 1 part by weight of triethanolamine to which is added 1 part of zinc stearate.

Example 12.—1 part of stearic acid with 1 part of triethanolamine.

*Example 13.*—1 part of stearic acid with 2 parts of triethanolamine.

*Example 14.*—1 part of stearic acid with 2 parts of triethanolamine and 1 part of zinc oxide.

*Example 15.*—2 parts of stearic acid with 1 part of triethanolamine and 1 part of water.

*Example 16.*—2 parts of stearic acid with 1 part of triethanolamine and 1 part of alcohol.

*Example 17.*—1 part of stearic acid with 1 part of cyclohexylamine.

In making up the liniments illustrated in the above examples, I prefer to use distilled water, but I may use other than distilled water provided it is sterile and contains no harmful substances or compounds which would react chemically with the organic bases and neutralize their effect.

I may use either a single organic base, such as triethanolamine, or I may use a solution of several different bases. While it is convenient to employ either water or alcohol alone as the solvent for the base, I may also use a mixed solvent comprising alcohol and water, etc. Again, in making up either the ointments or liniments of my invention I may add small amounts of perfumed materials or antiseptic agents, such as phenol or salicylic acid, hexylresorcinol, or guaiacol carbonate.

Although I prefer to apply the bases in the form of a liniment or ointment, I may apply any one or a plurality of these bases to the affected part directly. However, I have found that full strength is not necessary in order to effectively neutralize the poisons usually present in such conditions.

It will be apparent that my method of treatment and the emollients used therein have many advantages, among which may be mentioned the following:

The organic compositions, of which several examples have been given above, are superior to the remedies heretofore employed since they have no irritating action whatever on the affected part. They also possess no inconvenient physical properties and have the further advantage of possessing an inherent antiseptic power in themselves. One of the greatest advantages of their use is the fact that they are readily absorbed by the skin, thus permitting intimate contact between the medicinal agent and the irritant poison.

The ointment compositions being soluble in water may be easily removed from skin or clothing by washing, and for this reason are much superior to the usual greasy type of ointment made from lanolin or petrolatum.

As many apparently widely different embodiments of this invention may be made without departing from the spirit and scope thereof, it is to be understood that I do not limit myself to the specific embodiments thereof except as defined in the appended claims.

I claim:

1. An emollient for insect stings and plant poisons which comprises a 25% aqueous solution of triethanolamine.

2. An emollient for insect stings and plant poisons comprising an ointment containing the reaction product of triethanolamine and stearic acid.

3. An emollient for insect stings and plant poisons which comprises an ethanolamine.

4. An emollient for insect stings and plant poisons which comprises triethanolamine.

In testimony whereof, I affix my signature.

GEORGE DE WITT GRAVES.